Nov. 18, 1924.

F. M. CARROLL

LISTING MACHINE

Filed Sept. 30, 1922    13 Sheets-Sheet 5

1,516,079

INVENTOR
Fred M. Carroll
BY Cooper, Kerr & Dunham
his ATTORNEYS

Nov. 18, 1924.                              1,516,079
F. M. CARROLL
LISTING MACHINE
Filed Sept. 30, 1922        13 Sheets-Sheet 6

INVENTOR
Fred M. Carroll
BY Cooper, Kerr + Dunham
his ATTORNEYS

Nov. 18, 1924.
F. M. CARROLL
LISTING MACHINE
Filed Sept. 30, 1922   13 Sheets-Sheet 9
1,516,079
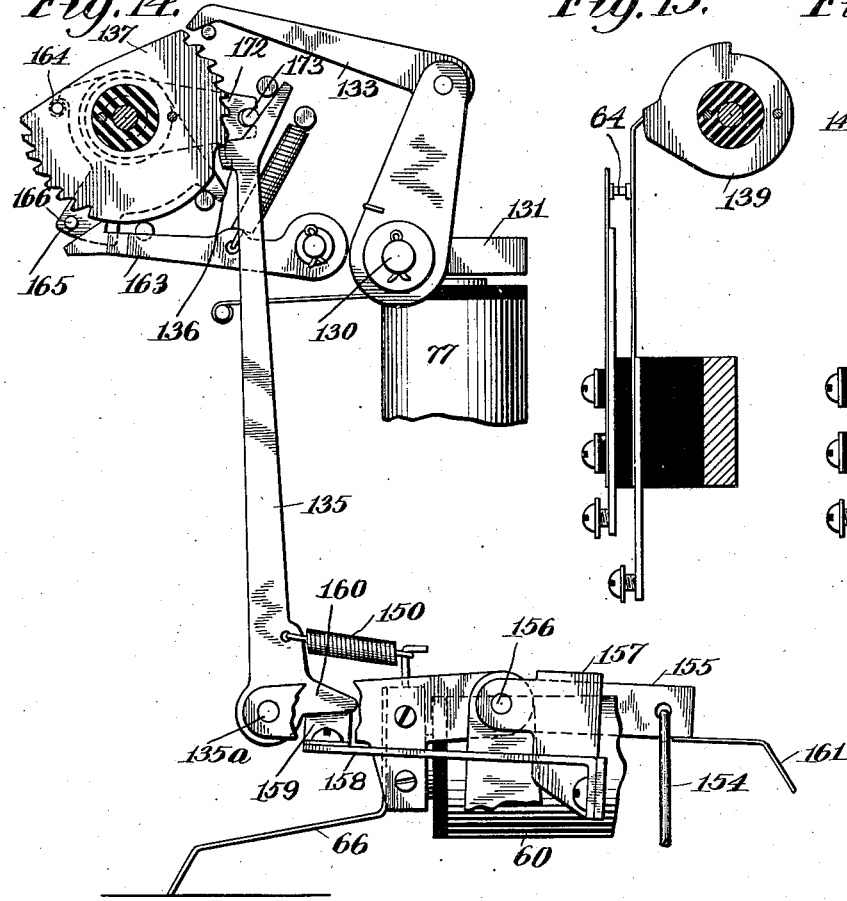
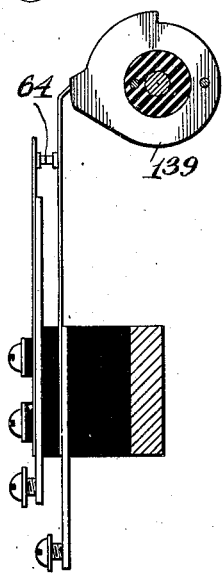
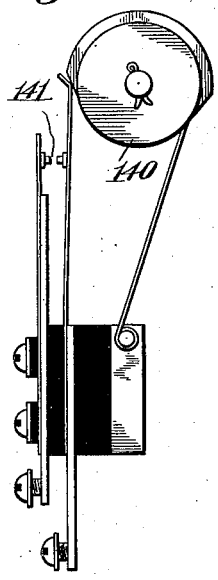
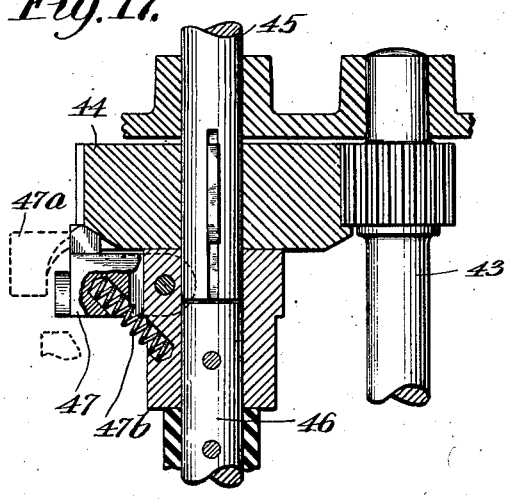
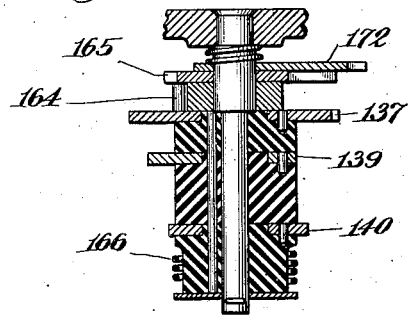
INVENTOR
Fred M. Carroll
BY Cooper, Kerr + Dunham
his ATTORNEYS Nov. 18, 1924.
F. M. CARROLL
LISTING MACHINE
Filed Sept. 30, 1922 13 Sheets-Sheet 10
1,516,079
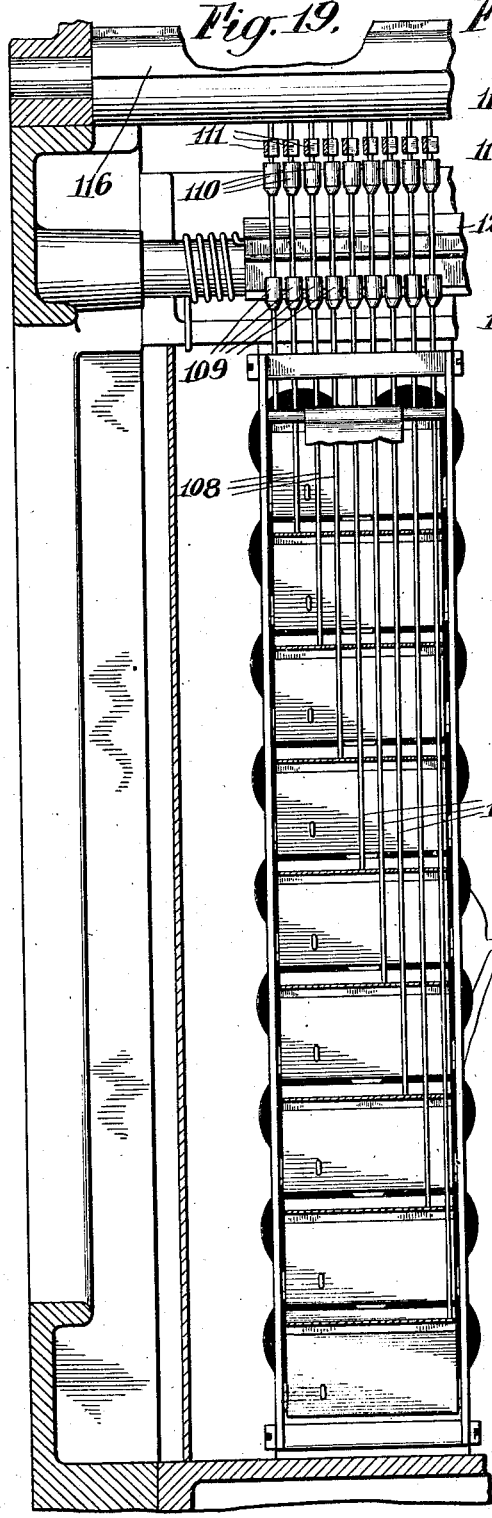
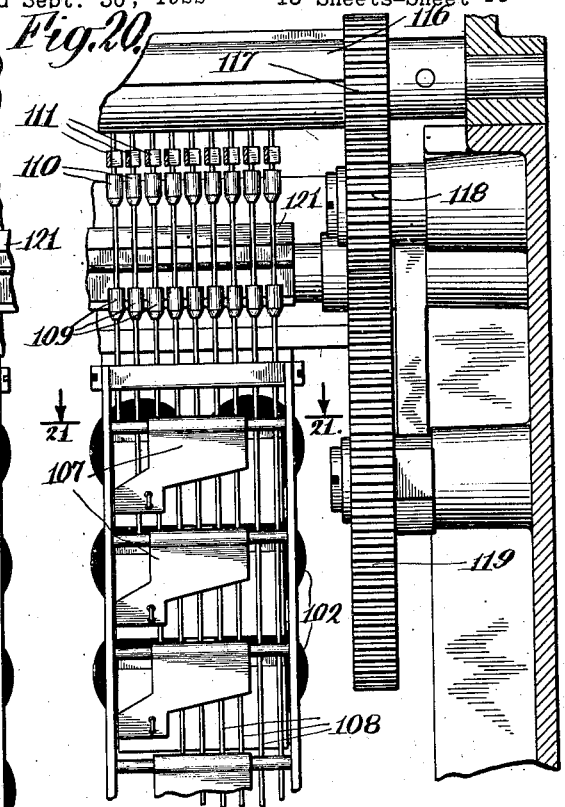
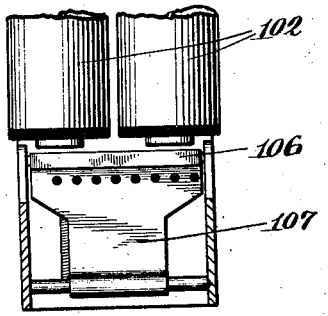

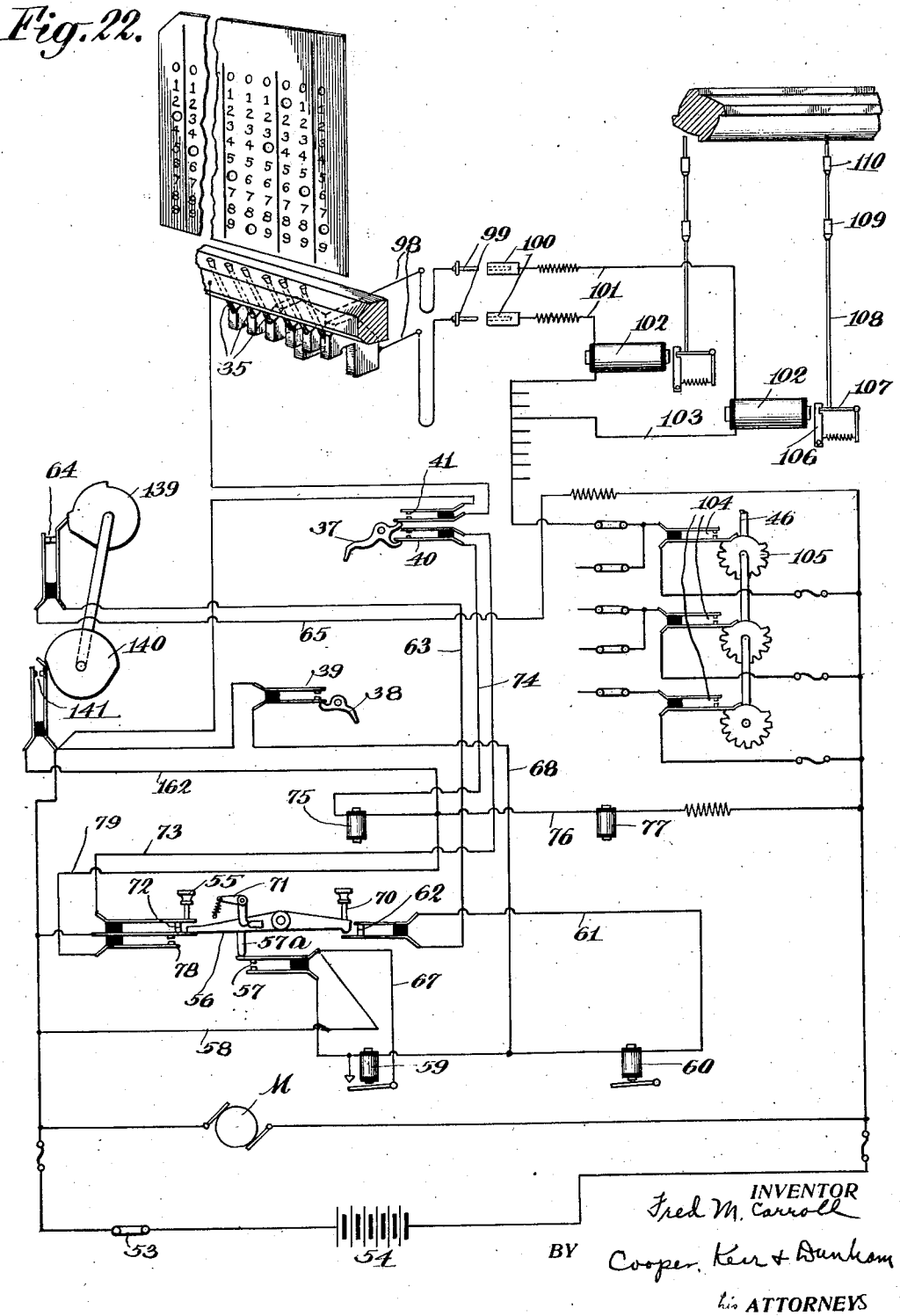

Nov. 18, 1924.

F. M. CARROLL

LISTING MACHINE

Filed Sept. 30, 1922     13 Sheets-Sheet 12

INVENTOR.
Fred M. Carroll
BY Cooper, Kerr & Dunham
his ATTORNEYS.

Nov. 18, 1924.

F. M. CARROLL 1,516,079

LISTING MACHINE

Filed Sept. 30, 1922    13 Sheets-Sheet 13

Inventor
Fred M. Carroll,
By his Attorneys
Cooper, Kerr + Dunham

Patented Nov. 18, 1924.

1,516,079

UNITED STATES PATENT OFFICE.

FRED M. CARROLL, OF ENDICOTT, NEW YORK, ASSIGNOR TO THE TABULATING MACHINE COMPANY, OF ENDICOTT, NEW YORK, A CORPORATION OF NEW JERSEY.

LISTING MACHINE.

Application filed September 30, 1922. Serial No. 591,584.

*To all whom it may concern:*

Be it known that I, FRED M. CARROLL, a citizen of the United States of America, residing at Endicott, in the county of Broome and State of New York, have invented certain new and useful Improvements in Listing Machines, of which the following is a full, clear, and exact description.

This invention relates to printing machines and is more particularly directed to the provision of a machine in which printing may be effected with great rapidity and also in which a plurality of printing operations may be effected in extremely rapid succession.

In the recorder art, when applied in connection with such machines as accounting machines, adding machines, tabulating machines and the like, printing is usually effected by differentially displacing one or more type carriers to one or more determined positions, then arresting the type carriers, thereafter taking an impression therefrom, and afterwards restoring the type carriers to normal position, where they are again stopped. Various instrumentalities are used to effect these results, but generally the cycle is maintained as set forth. It has been found in practise that the speed of printing is limited by the character of the cycle. If the parts are moved too rapidly, the shock and impact become so excessive when the type carriers are arrested at the home position or at the differentially set position, that either the printing becomes inaccurate or the machine is damaged.

As an illustration, in the well known printing tabulators where an entire line of characters is first set up and an impression then taken of the entire line at once, it has been found that the printing of about 80 to 85 lines per minute is the maximum.

The type carriers are first so arranged as to always move progressively in the same direction. This obviates the objectional retrograde movements which were heretofore necessary. Secondly, the types are preferably so arranged that they are always moving at their maximum speed toward the printing line, thus obviating the loss of time due to stopping and starting of the carriers and also obviating the shock of impact caused by the interrupting of their movement.

Broadly this is accomplished by mounting the type members upon a rotating carrier which is in constant motion, so that the type members move constantly and rapidly past the printing line. Type selector elements controlled by the means from which the data is being taken are adapted to call into operation the particular type or types, when they arrive at the printing line.

The improved printing device is herein disclosed in combination with a perforated card controlled device in which the index points of record cards are read by suitable reading devices and in which the designations corresponding to these index points are printed upon a suitable sheet. In its broad aspects the present improvement is not so limited to this particular use, but may be applied to any printing device.

In machines of this nature where the data is taken from cards, the movement of the last card past the reading position serves to bring the machine to a stop before said card reaches its final position in the discharge pocket of the machine. Another object of the invention is to devise a method and means whereby said last card may be carried to said pocket.

Other objects of the invention will appear in the description of the invention which follows.

Referring to the drawings, wherein I have shown what I now consider to be the preferred form of my invention:

Fig. 14 is an enlarged detail of certain of the pawl devices shown in Fig. 11 for feeding the paper.

Figs. 15 and 16 are details of cams and contacts shown in Fig. 11.

Fig. 17 is a sectional view of a clutch mechanism taken on line 17—17 of Fig. 11.

Fig. 18 is a sectional view of contact controlling cams taken on line 18—18 of Fig. 11.

Fig. 19 is a sectional view taken substantially on line 19—19 of Fig. 3, showing type selecting rods and the magnets for actuating the same.

Fig. 20 is a similar view taken at the opposite end of the machine.

Fig. 21 is a fragmentary sectional view taken on line 21—21 of Fig. 20.

Fig. 22 is a wiring diagram.

Figs. 23 to 27 inclusive are fragmentary details showing the successive steps in the operation of a type lever.

Figure 28:
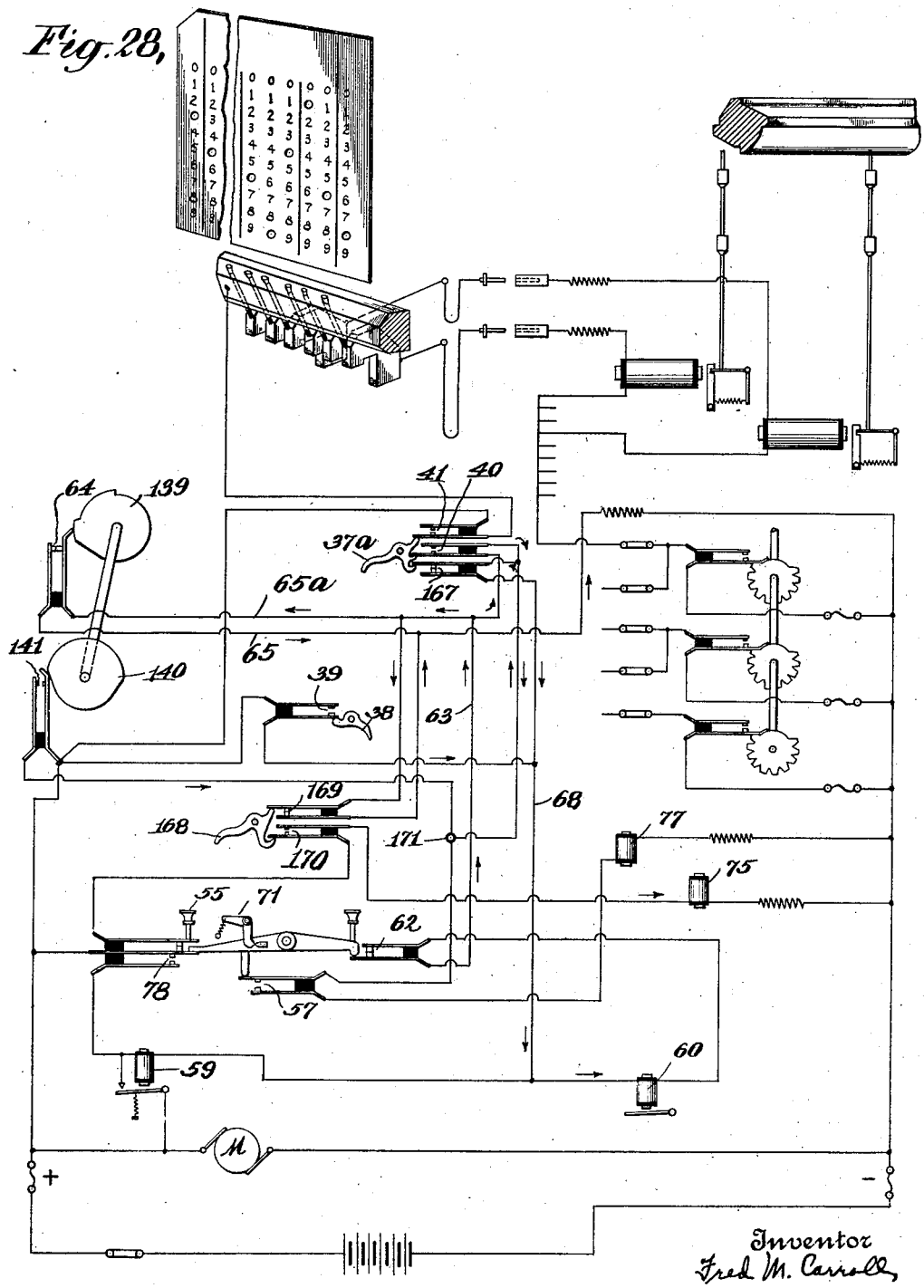

Fig. 28 is a wiring diagram illustrating certain modifications designed to cause the last card passing through the machine to be carried to the discharge stack.

Figure 1:
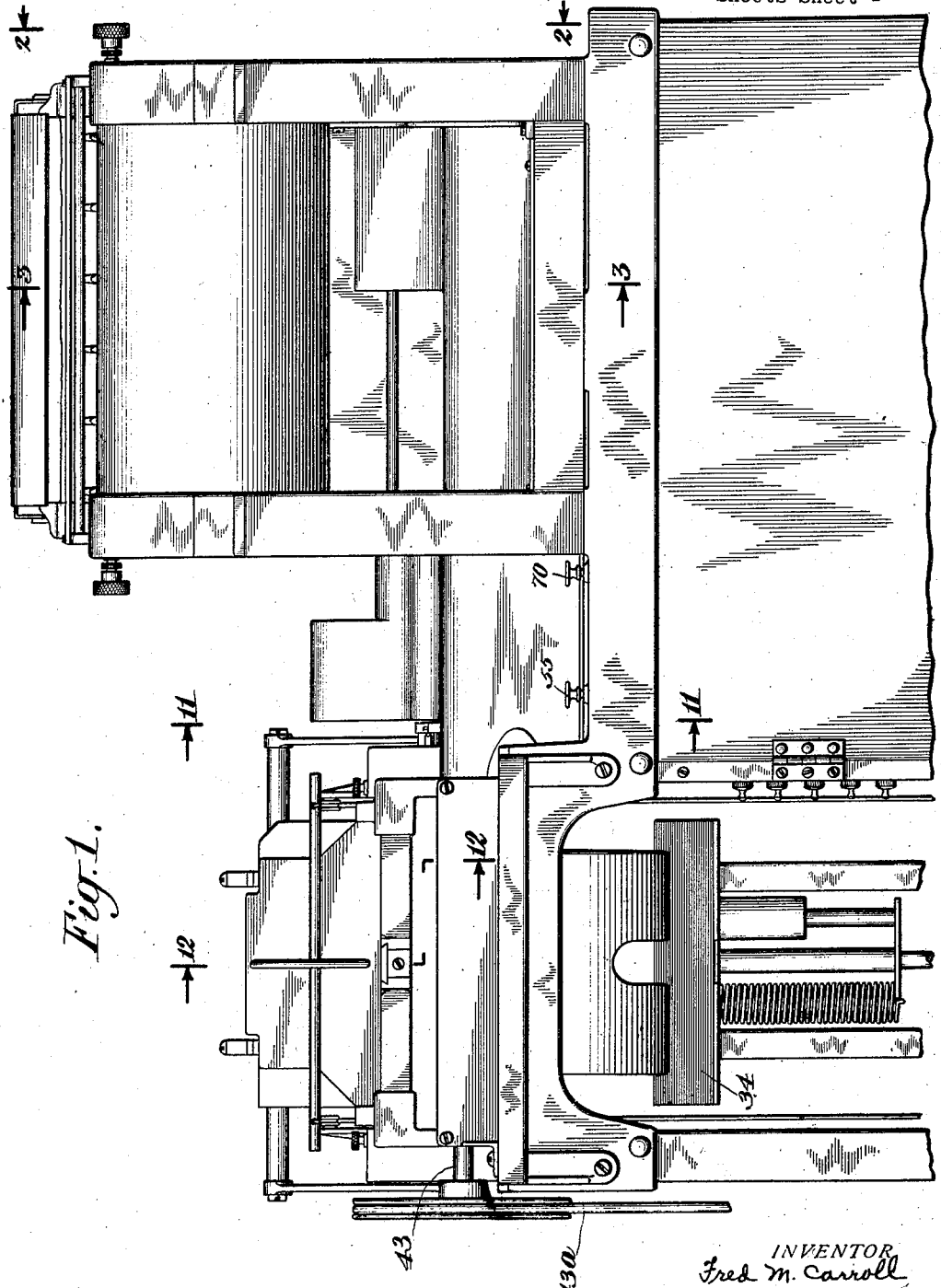
Fig. 1 shows a front view of the machine.
Figure 12:
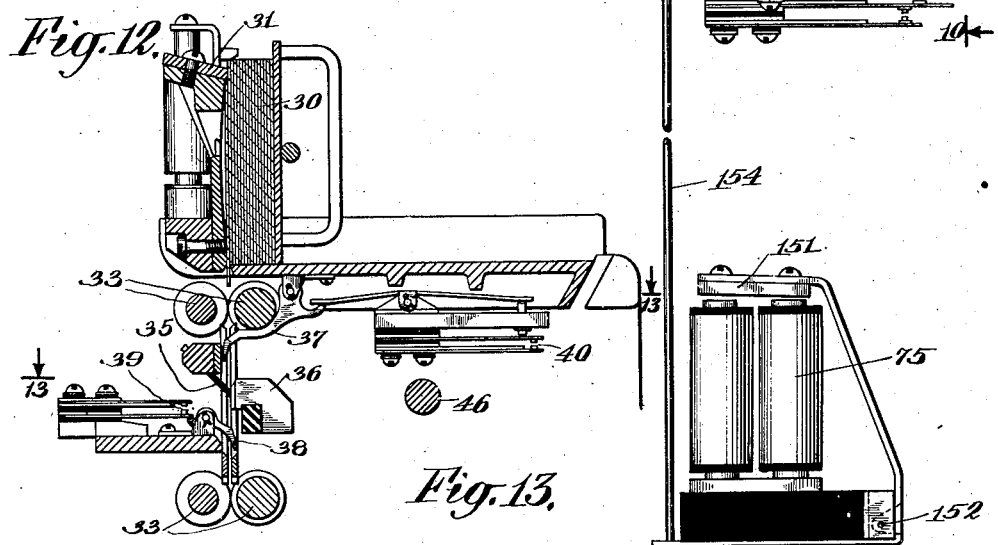
Fig. 12 is a sectional view of the card feeding devices taken on line 12—12 of Fig. 1.
Figure 13:
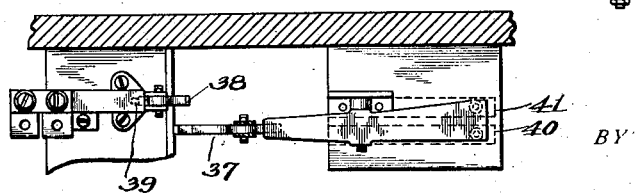
Fig. 13 is a top detail view of certain of the card levers shown in the preceding figure. This section is taken on line 13—13 of Fig. 12.

Like all devices of this sort the machine comprises the usual and well known card feeding section shown best to the left in Fig. 1, and in Fig. 12. This section includes an upper supply stack 30 from which the cards are taken one by one by a picker 31 and fed by feed rolls 33 to a discharge stack 34 (Fig. 1). During their passage through the feeding mechanism the cards pass between brushes 35 and contact blocks 36 (see Figs. 12 and 22); and when perforations or index point positions are reached circuits are completed therethrough to control the setting of other devices as will hereinafter be described. These parts being of common form in the well known Hollerith tabulating machine, require no detailed description. The passing cards are also adapted to swing back upper and lower card levers 37 and 38. The latter lever is adapted to close contacts 39 and the former through an intermediate lever is adapted to close contacts 40 and 41 (Fig. 13). With no cards in the machine (under the brushes) both card levers will be in the position shown in Fig. 12 with both contacts open as shown.

Drive of the tabulator is secured from the usual motor M which drives main drive shaft 43 by the belt and pulley 43ª shown in Fig. 1.

Figure 2:
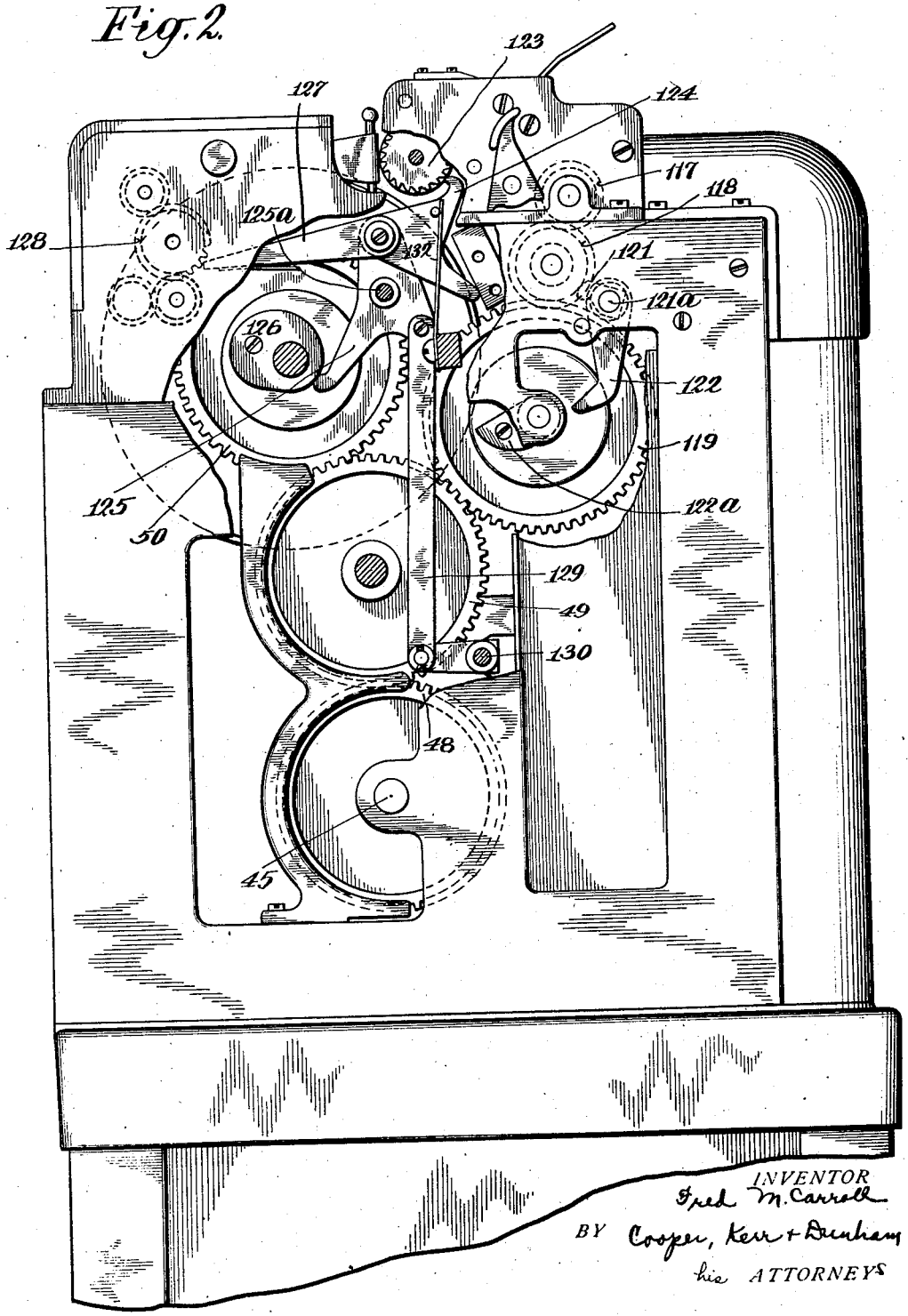
Fig. 2 shows a side view taken on line 2—2 of Fig. 1, with portions of the housing broken away to show the interior parts.
Figure 3:
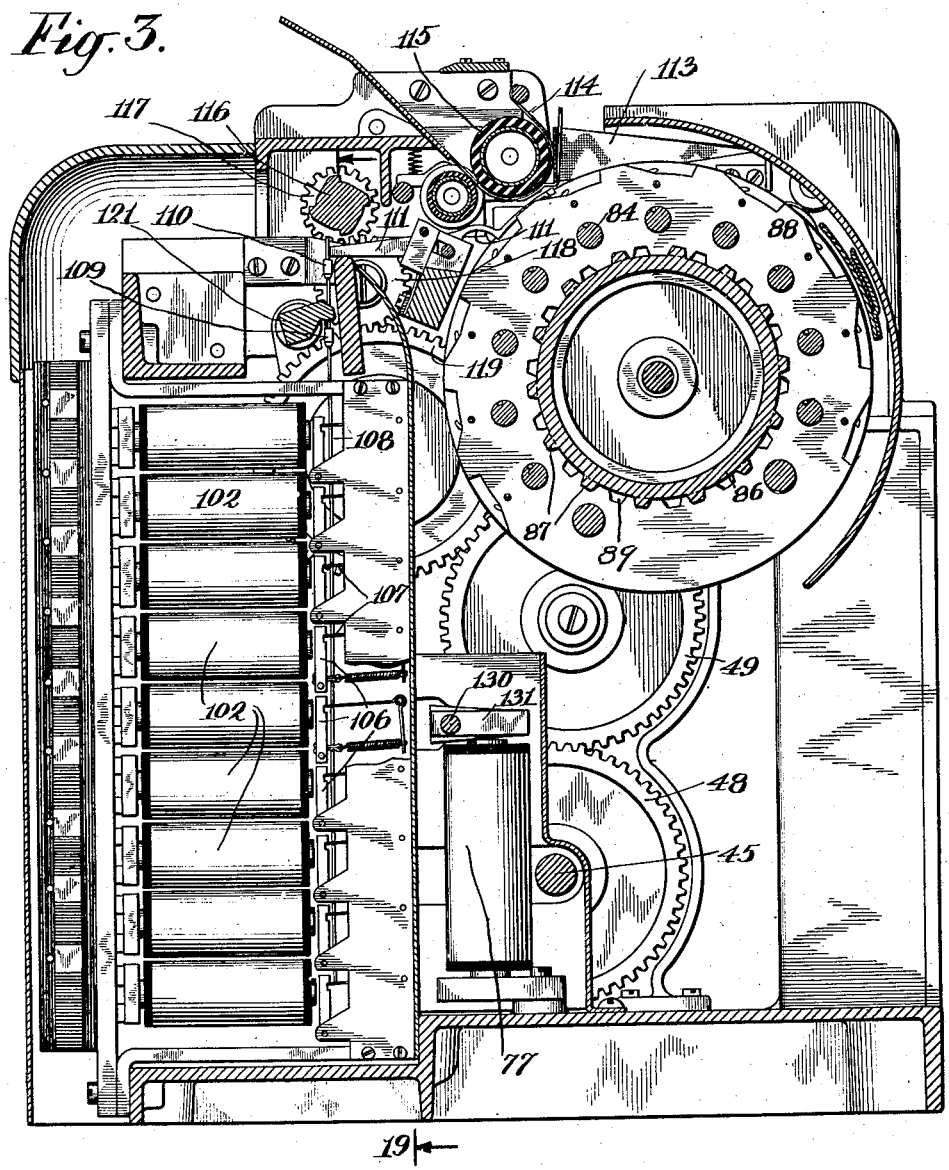
Fig. 3 is a sectional view taken on line 3—3 of Fig. 1, and shows the printing drum in section.
Figure 4:
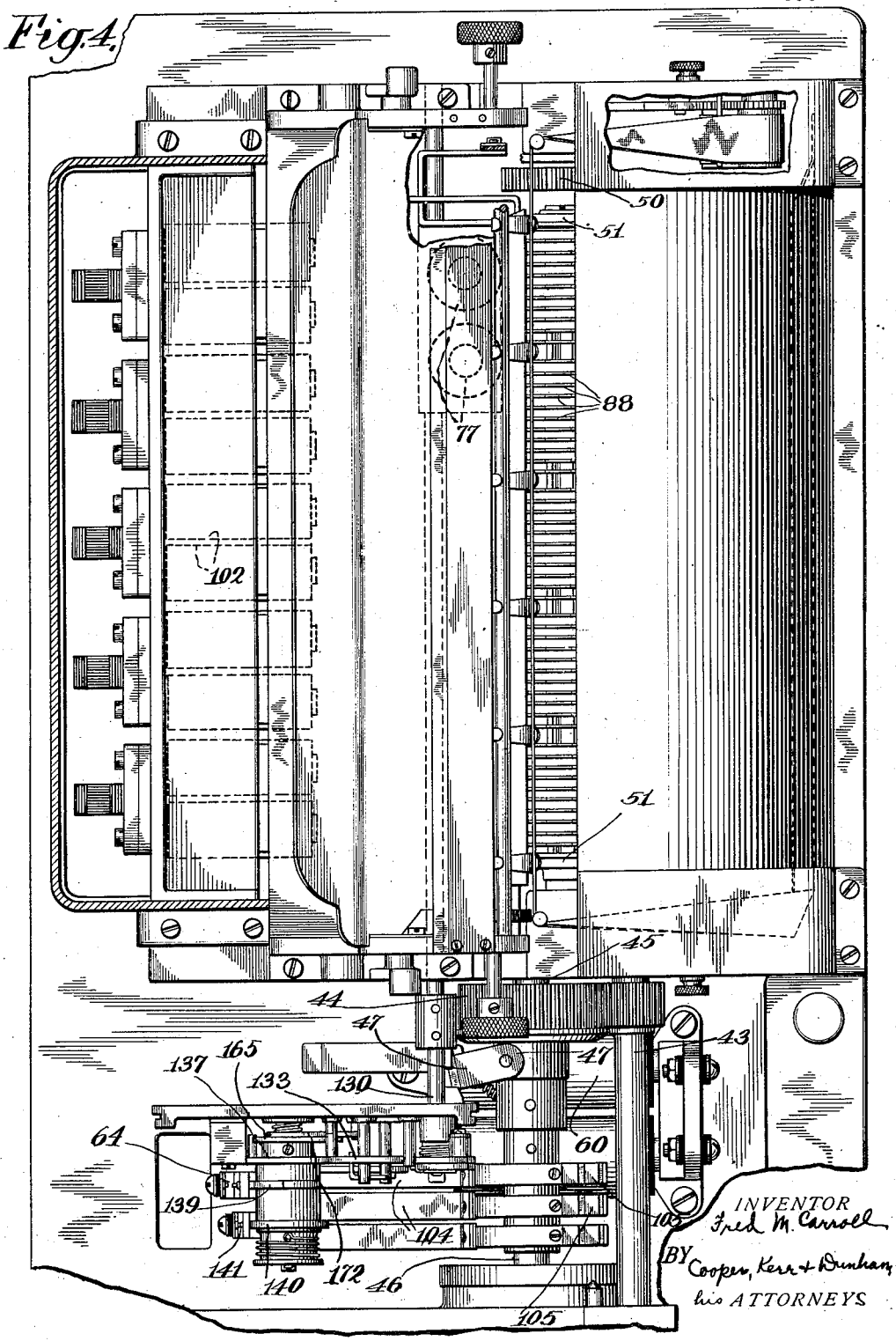
Fig. 4 shows a top plan view of the machine with the card feeding devices omitted.
Figure 8:
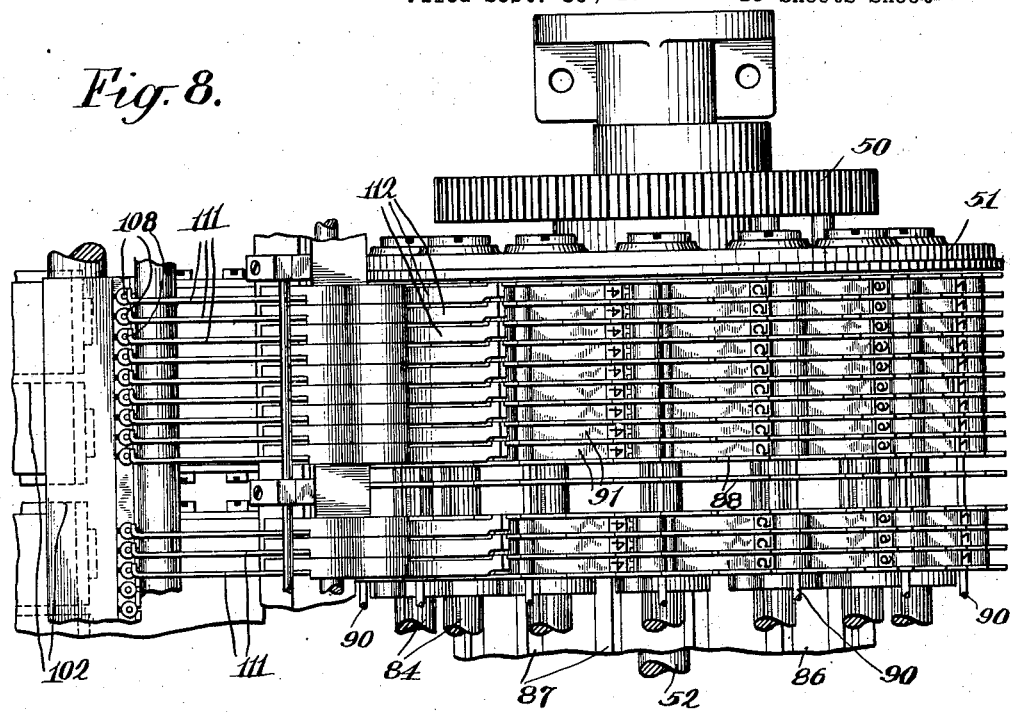
Fig. 8 is an enlarged top detail view of one section of the printing drum.

Shaft 43 through a suitable pinion drives a spur gear 44 mounted upon a shaft 45 (see Figs. 1, 4 and 17). In alignment with shaft 45 is a shaft 46 which is adapted to drive the card feeding devices. This shaft 46 may be clutched to rotate in unison with gear 44 by means of a clutch device 47 which is of the one revolution type and magnetically controlled by a clutch magnet 60, Fig. 11, as will hereafter be described. The gearing which drives the card feeding rolls 33 from shaft 46 is not shown as this is of the usual form employed for devices of this sort. Shaft 45 extends in the opposite direction from shaft 46 and is adapted to drive the printing section of the machine. As shown in Figs. 2 and 3 the shaft 45 carries rigidly mounted thereon a gear 48 which through an intermediate gear 49 drives a gear 50 which is rigidly mounted upon the end of a printing drum 51 (Fig. 8). The printing drum 51 is mounted upon a fixed shaft 52 (Fig. 9) which shaft is supported by suitable bearings shown in Figs. 8 and 9.

Prior to describing the detailed operation of the printing device a brief description will be given of the method of setting the machine into operation. It will be assumed that cards are in the supply stack 30. Referring now to the circuit diagram, Fig. 22, the operator first closes switch 53 which places the motor M in circuit with a suitable source of current 54. The motor now rotates and through the pulley and belt 43ª drives shaft 43 and this shaft through the pinion 44 and shaft 45 rotates the printing drum. During this initial part of the operation, the card feeding devices are entirely inoperative. In order to operate the card feed it is necessary that the shaft 46 be clutched to the shaft 45. This control is effected in the following manner. When it is desired to list cards the operator depresses the start key 55, Figs. 22 and 1. Depression of the start key rocks the pivoted lever 56 which when rocked moves a pin 57ª to close the contacts 57. The closure of these contacts establishes a circuit from the left side of the line through wire 58, contacts 57, main control relay 59, clutch magnet 60, wire 61, contact 62, now closed, wire 63, contacts 64, now closed, wire 65 to the other side of the line. The energization of the clutch magnet 60 causes a coupling of shafts 45 and 46. The energization of clutch magnet 60 attracts its armature which is spring controlled by a spring 66, Fig. 11, so as to normally engage the clutch element 47 and when magnet 60 is energized the part 47ª is withdrawn from contact with the projecting stop of the clutch element 47 allowing the clutch element 47 to engage, under pressure of spring 47$^b$, the gear 44, as shown in Fig. 17. So long as clutch magnet 60 is energized the card feeding devices will rotate in unison with shaft 45.

Cards now are fed downward through the card feed devices and one by one past the controlling brushes. When the first card has passed beyond the upper rolls 33 it will engage with and first swing the upper card lever 37 and thereafter the lower card lever 38. These card levers 37 and 38 are shown diagrammatically in Fig. 22. It may be here explained that it is not necessary to maintain the start key 55 depressed since after current flow is once initiated through control relay 59 the armature of this relay establishes a holding circuit through branch path 67. After the machine has been properly started and cards have passed the card levers the control of the card feed clutch circuit including clutch magnet 60 is taken away from the main motor relay and is put under the direct control of the card levers. When card lever 38 is engaged by a card a circuit is closed traced as follows: from the left side of the line through contacts 39, wire 68, card feed clutch magnet 60, wire 61, contacts 62, wire 63, contact 64, wire 65 to the other side of the line. When the foregoing circuit is established the current flowing through relay 59 is so reduced that its armature falls thereby interrupting its circuit.

The foregoing description has explained how the machine is started in operation, the printing drum set into rotation and cards started passing through the card feeding devices. Provision is made for interrupting the card feeding operation in two ways; one by means of an emergency stop key 70, and the second by means controlled by the passage of the last card or a stop card through the machine. The emergency stop key 70 is adapted when depressed to interrupt the circuit 61 by opening contacts 62 and thus deenergize the card feed clutch magnet 60. Under these conditions the card feed will be interrupted at a predetermined position in the card feed cycle by means of the controlling stop 47$^a$. When the emergency stop key is depressed the lever 56 is maintained rocked by means of a small detent device 71 which engages a suitable projection upon the lever. During normal running conditions a circuit will be established from the left side of the line through contacts 72, wire 73, contacts 40, now closed, wire 74, spacing dog magnet 75, line 76 and paper feed magnet 77 to the other side of the line. These circuits will be maintained so long as contacts 72 are closed. Upon the depression of stop key 70 these contacts are opened and the circuit through magnets 75 and 77 is interrupted. The purpose of magnets 75 and 77 will be hereafter described.

The foregoing description has explained the manner of stopping the card feed by means of the emergency stop key 70. Means must be provided also for stopping the card feed when the last card or a stop card has passed through the machine. Stop cards as is well known in this art usually comprise a blank card of the usual form with the corner notched out so as to clear the card levers. Under these conditions the card levers swing and assume the same position they would if no card was present in the machine. If no card is under levers 37 and 38 they assume the position shown in Fig. 22 and consequently since the flow of current through the clutch magnet 60 is through the line 68, after this line is broken by the opening of contacts 39 the card feed clutch magnet 60 will be deenergized and the card feed will be interrupted at the proper time in the cycle.

Prior to the printing operation it is desirable to impart a preliminary spacing to the paper to insure the first printing impression being upon a proper line and to avoid irregular spacing of the initial imprints. Such control is obtained by means of the contacts 78 which are adapted to be closed by the depression of the start key 55 thereby closing a circuit 79 leading to the line 76, which line includes the paper feed magnet 77. This effects an initial feed of the paper.

Having explained how the machine is started into operation and cards started past the controlling brushes, the printing devices will now be further described.

Figure 9:
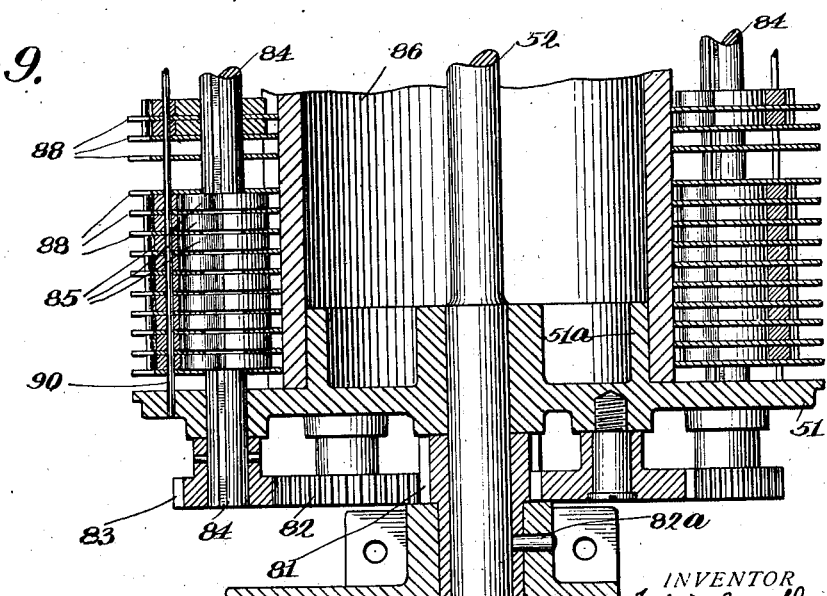
Fig. 9 is a detail sectional view thereof taken on line 9—9 of Fig. 7.

The printing drum has heretofore been described as rotated by a gear 50. This drive gear is shown in Fig. 8 and as shown in Fig. 9 at the opposite end of the printing drum 51 there is a pinion 81 which is fixed against rotation by the pin device 82$^a$ which pins the bushing which is extended from the gear to the fixed bearing for shaft 52. Meshing with the pinion 81 are a number of intermediate gears 82 which are rotatably mounted upon suitable studs carried by the end plate 51 of the drum as shown in Fig. 9. The intermediate gears 82 in turn enmesh with smaller pinions 83 (see also Fig. 7). The pinions 83 are fixedly mounted upon shafts 84. These shafts are suitably splined to receive controlling cams 85 best shown in Fig. 6. It will be understood that there is one controlling cam 85 on each shaft 84 for each column of index point position in the card to be listed. The purpose of the cams 85 is to aid in controlling the operation of the type devices which effect the printing.

Figure 5:
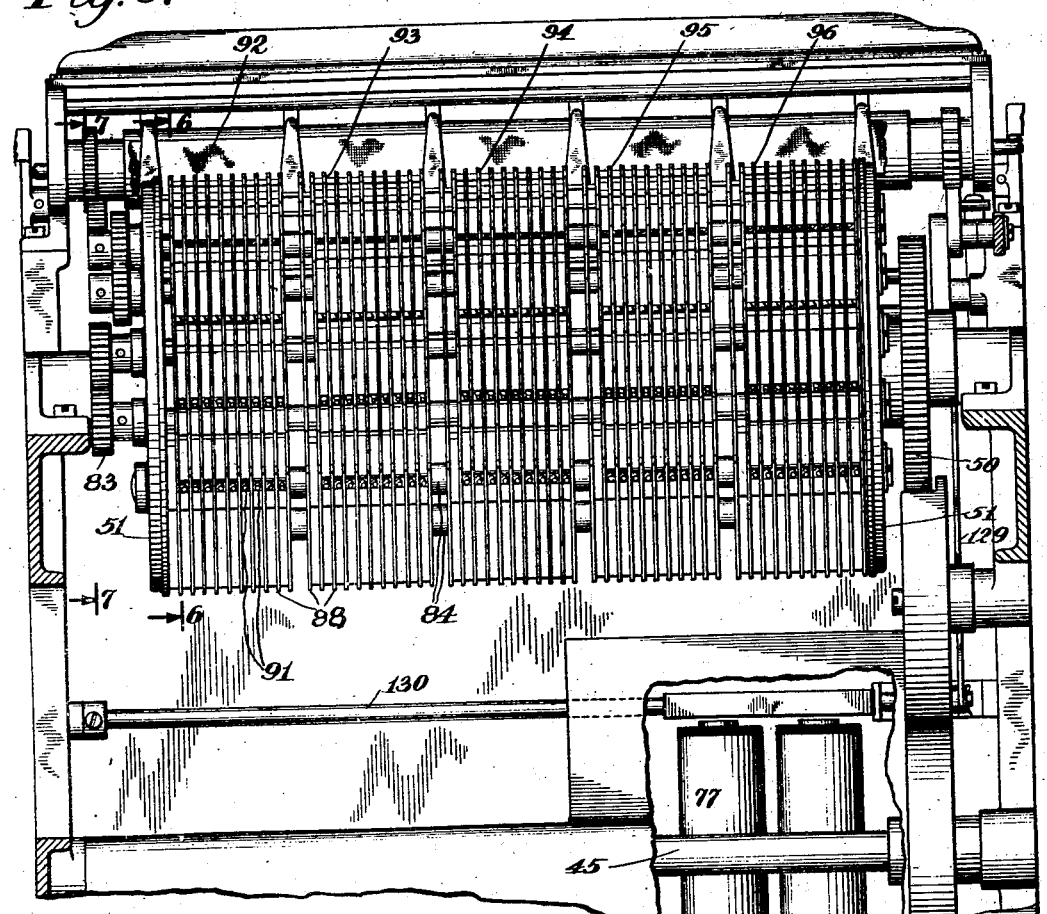
Fig. 5 is a front view of the printing drum with its driving gearing, with cover removed.
Figure 10:
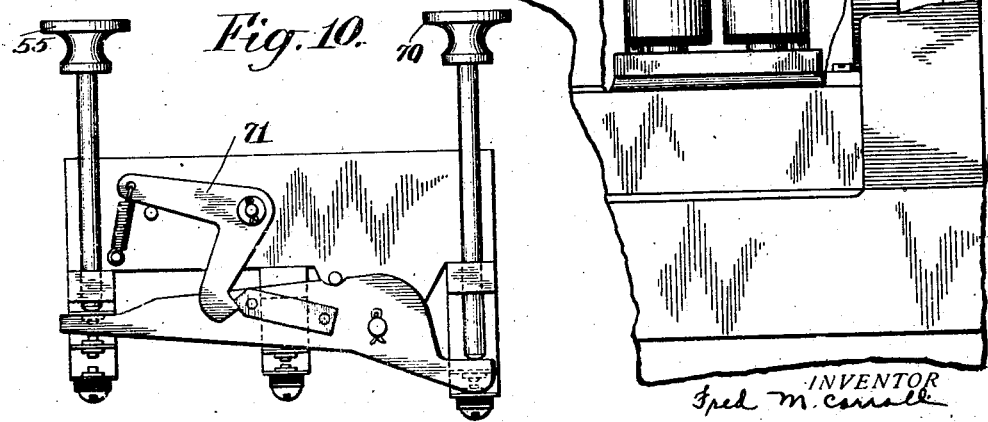
Fig. 10 is a detail of the start and stop keys. This view is taken on line 10—10 of Fig. 11.
Figure 6:
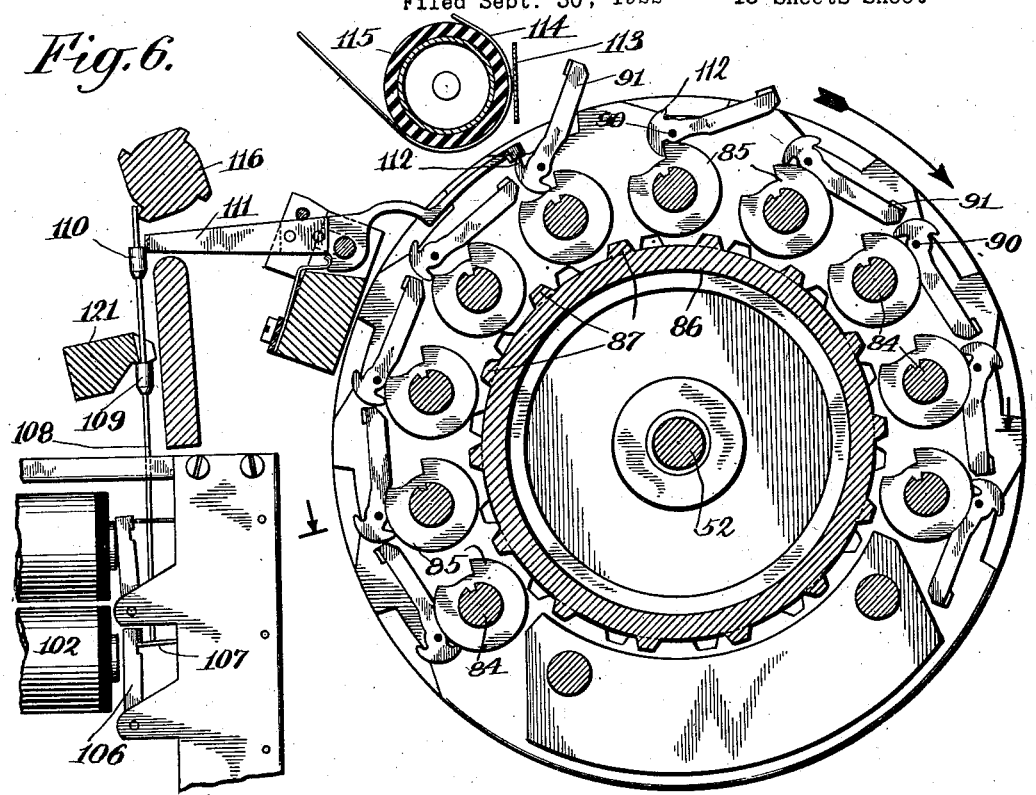
Fig. 6 is a detail sectional view of the printing drum taken on line 6—6 of Fig. 5.
Figure 7:
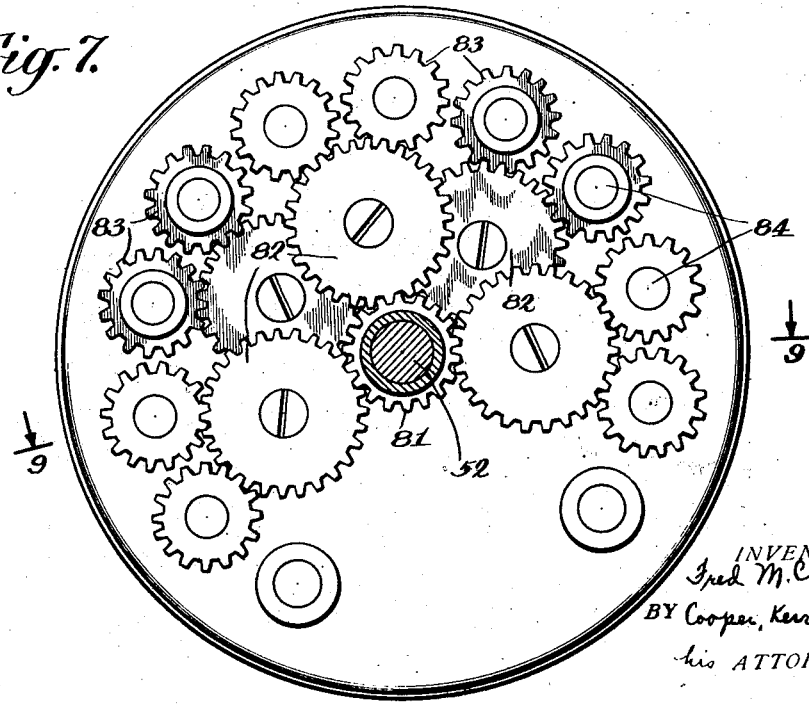
Fig. 7 is an end view of the driving gearing taken on line 7—7 of Fig. 5.

Referring now to Figs. 6, 8 and 9 of the drawings the printing drum comprises suitable end plates 51 heretofore described which are provided with suitable annular bosses 51$^a$ to receive a central annular drum member 86. The member 86 is provided with outer splines 87. Annular plates 88 are suitably recessed to slip over the splines 87 and at proper intervals the splines 87 are notched to permit the plates to be turned slightly so as to throw their notches 89 out of alignment with the splines 87, as shown in Fig. 6. In this way the plates 88 are spaced apart at desired intervals. The plates 88 are suitably drilled to permit the shafts 84 to pass therethrough and are spaced at such interval as to permit the mounting of one cam 85 between each two adjacent plates 88 (see Fig. 9). Plates 88 are also drilled to receive a through pivoted wire 90, best shown in Fig. 9. This pivoted wire provides a pivotal support for type bars 91. In the machine here shown there are ten pivoted wires 90 and each pivoted wire has a corresponding type bar mounted thereon between each two adjacent plates 88. As best shown in Fig. 5, the printing drum comprises a plurality of type sections 92, 93, 94, 95 and 96. Each section corresponds to a particular card field and, as herein shown, each section has ten spaces between the plates 88 in which the type may be received. Of these in the present embodiment nine are utilized for type. This gives a total of forty-five rows of type upon the drum corresponding to the forty-five rows of index column positions upon the record card. Record cards, as usually used in the tabulator art, include ten digit positions running from 1 to 9 and zero. Therefore disposed about the periphery of the drum, as shown in Fig. 6, there are ten separate sets of type bars 91. Each type bar 91 corresponds to a digit position in a given index point column and there is a corresponding type bar for each of all the other digit positions in said column and other columns. The timing of the drives of the parts is such that the printing drum makes one complete revolution for each passing card. The type bars 91 are so positioned upon the drum that a type bar 91 corresponding to a certain digit value, say 7, passes a fixed point always at the time that the corresponding index point perforation, say the 7 point, passes under the corresponding brush and contact line. Means is provided for calling into action a type bar 91 when its corresponding index point perforation passes under the controlling brushes. This means will now be described.

Referring now to the circuit diagram of Fig. 22, individual wires 98 lead from various contact blocks 36 to a plug-board represented by plugs 99. The usual connecting plug connections are utilized to connect any desired columns upon the card with plug-board points 100 from which wires 101 lead to the controlling magnets 102. In the diagram two of these printing magnets and two of the sets of wires are shown but in practise there will be a corresponding printing magnet 102 for each index point column upon the card and for each corresponding contact block 36.

Assuming that the card has passed under the brushes and the card circuit closed by the perforation in the card acting under the brush, current will flow from the left side of the lines through brush, contact block, wire 98, plug board 99 and 100, wire 101, type controlling magnet 102, wire 103 to cam contacts 104. These contacts are closed by a multipoint cam device 105 which is mounted upon a shaft 46, as previously described.

The multipoint cam member 105 is adapted to close the contacts 104 and establish the brush circuit at the time the brushes establish the circuit through the perforation in the card. The member 105 and cam contacts 104 therefore serve to interrupt this circuit before this brush has left a hole in the card thereby preventing arcing at the card controlled brushes. In practice a number of breaker devices 104 and 105 are provided and these breaker devices may be utilized to control circuits by multipoint columns. Any number of the breaker devices 104 and 105 can be used depending upon the circuit conditions and the current flow at the contacts 104. The energization of magnet 102 under the control of the perforation in the card is adapted to attract its armature 106 and release a spring latch 107 (see also Figs. 3, 19 and 20). Cooperating with each spring latch 107 is a so-called call-wire 108 which extends upwardly to a point at one side of the printing drum. These call-wires are suitably guided for vertical movement and at their upward ends are provided with two shoulders or abutments 109 and 110. With the latter abutment a spring retained hook member 111 is adapted to cooperate (see Fig. 6). The operation of the hook member may be best shown in Figs. 23 and 24. When the call-wire 108 is elevated by the release of the spring latch 107 the hook member is thrown clockwise into engagement with a hook end 112 on the type bar 91. The rotation of the printing drum is clockwise in Figs. 6 and 23, as shown by the arrow. This engagement of the hook member swings the selected type member 91 rapidly in a counterclockwise direction and the momentum of this type bar movement is sufficient to impact the type carried by the bar against the ribbon 113 and effect printing of the type upon the paper 114 carried by the platen 115. At the time of this printing action the hook member 111 is disengaged from the hooked end 112, as clearly shown in Fig. 24. Such disengagement is effected by means of a knock-off cam 116 which is provided with projections cooperating with the ends of the call-wires 108. Operation of the knock-off cam 116 is effected by means of a gear 117 which through intermediate gear 118 (Fig. 3) is driven by gear 119 which in turn is driven from the gear 49, as shown in Fig. 2. During the printing operation the cam 85 is turned to the position shown in Fig. 23 to bring the recess 120 thereof under the tail of the type bar 91 and thereby permit the free swing of the type bar. Immediately after the printing operation cam 85 will have turned counterclockwise sufficiently to have contacted against the tail of the type bar 91 and start it to restore the type bar 91 clockwise to its normal tangential position.

Figure 26:
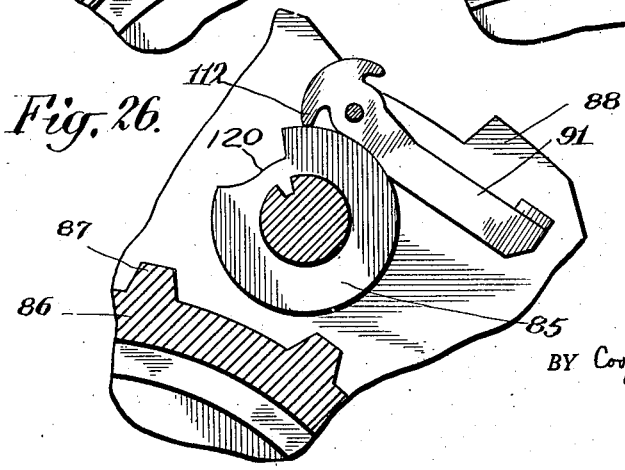

Fig. 26 shows the type bar fully restored and locked by the engagement of the arcuate portion thereof with the circular periphery of cam 85. It will be understood that all type on the drum are locked at all times against outward movement and that they are only released when the notch comes under the tail of the type bars 91.

Figure 27:
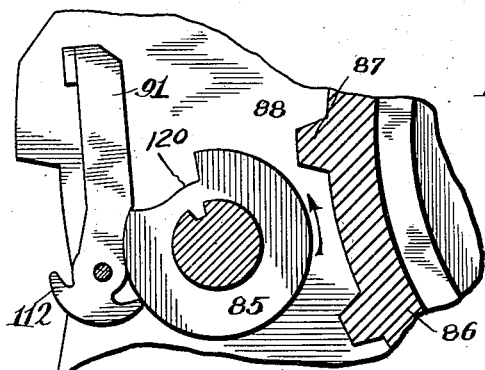
Figure 23:
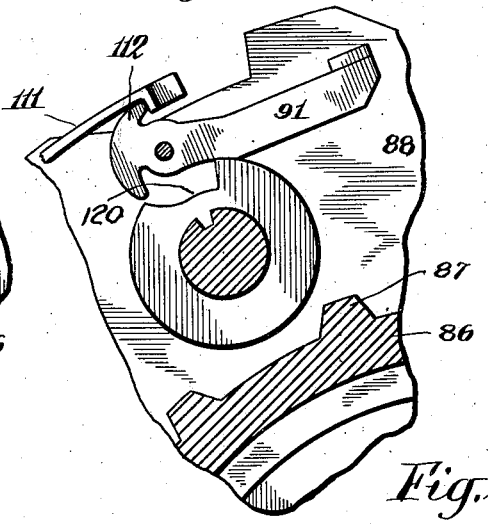
Figure 24:
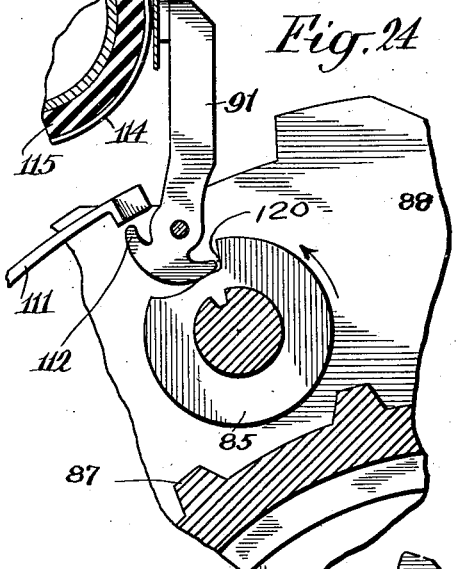
Figure 25:
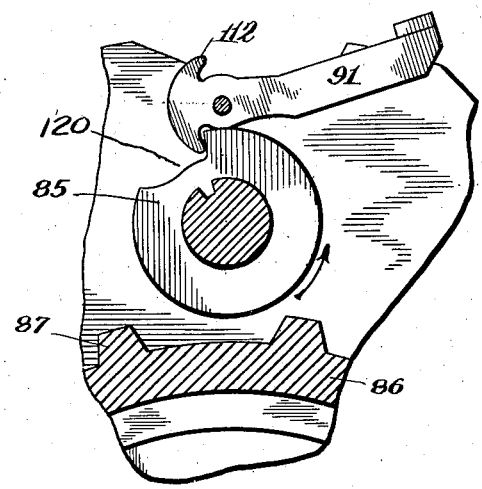

Fig. 27 shows the cam 85 locking the type bar 91 but just about to release the same prior to a possible printing operation. After the call wires have hooked the type bar provision is made for restoring the call wires to their normal lower position and relatching the latched members 107 in the armature 106. Such restoration is effected by means of a restoring bail 121, shown in Fig. 3, and having nose portions adapted to cooperate with the projections 109 on the call wires 108. This restoring bail is spring returned and is mounted upon a shaft 121ª carrying a cam follower 122 (see Fig. 2), which follower cooperates with the cam 122ª fast to gear 119.

After each printing operation provision is made for feeding the paper forward one line space on the platen carriage. A ratchet 123 on the platen shaft cooperates with a pawl 124 which is pivoted upon a lever 125 in turn pivoted at 125ª and having a nose portion cooperating with cam 126 fixed to gear 50. At the proper time in the drum cycle the cam 126 actuates pawl 124 to turn the printing platen carriage one step. A supplementary pawl 127 is also provided which actuates ribbon feed devices 128. The ribbon is of the continuous type and is advanced one step at each pawl operation. Restoration of the lever member 125 and control of the paper spacing action is also controlled through certain supplementary devices which will now be described.

Depending from lever 125 is a link 129 which through a suitable crank connects with a shaft 130. This shaft, as shown in Fig 3, forms the pivot of the armature 131 which is adapted to be attracted by magnet 77. The energization of this magnet 77 is controlled in the manner heretofore described. During the normally successive printing operations magnet 77 remains energized and acts as a spring upon the arm lever 125 tending to keep same in contact with cam 126. If magnet 77 remains deenergized part 125 will remain away from cam 126 under the influence of spring 132, Fig. 2, and no paper feeding will take place.

In addition to the means which feeds the paper one line space for each printing operation, I may provide means for feeding the paper several line spaces. Such means may be brought into operation between groups of cards so that several distinct groups may be listed with an extra wide space between each group.

Figure 11:
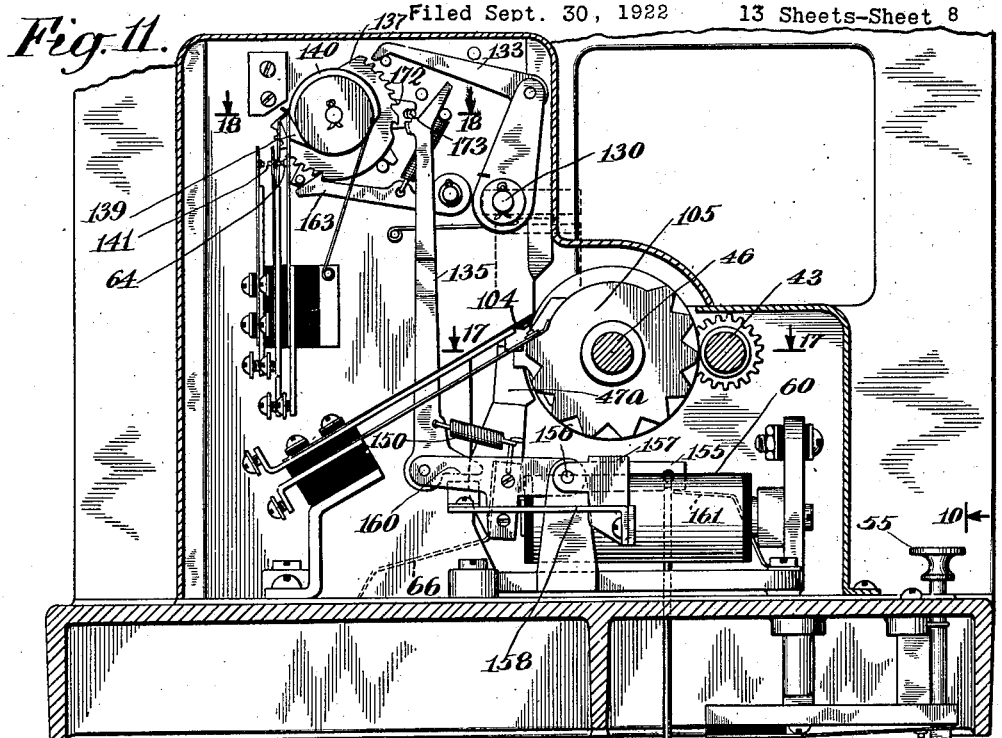
Fig. 11 is a sectional view of certain of the cam contact devices for controlling the paper feed. This section is taken on line 11—11 of Fig. 1.

For this purpose shaft 130 which controls the paper feed also carries a pawl 133, Figs. 11 and 14, adapted to cooperate with a ratchet 137. On the same shaft with ratchet 137 are cams 139, 140, Figs. 15, 16 and 18, adapted to control the contacts 64, 141, Figs. 22. Stop cards are placed between the several groups of cards from which data are being taken. When a stop card passes card lever 38, contacts 39 are opened temporarily, permitting deenergization of magnet 60. This throws out the card feed clutch shown in Figs. 11 and 17 as we have heretofore seen. It also permits pawl 135, which is pivotally attached to an extension 135ª of the armature of magnet 60, to be raised slightly under the influence of spring 66. Normally spring 150 prevents the shoulder 136 of pawl 135 from engaging ratchet 137. But when a stop card passes through the machine, and contacts 39 open to break the circuit through magnet 60, the magnet 75 is receiving current through the following circuit: from the left side of the line, through contacts 72, wires 73, contacts 40, wire 74, magnets 75, 77 to the other side of the line.

The armature 151 of magnet 75 is pivoted at 152 and is attached through an extension 153 to a rod 154. Said rod is attached to a lever 155 fixed on a shaft 156 to which is also fixed an arm 157 having a projection 158 provided with a lug 159 adapted to engage a shoulder 160 on pawl 135. A spring 161 normally holds arm 158 out of engagement with pawl 135, but is overcome by magnet 75 so that the arm engages the pawl and overcomes the spring 150, causing the pawl to engage ratchet 137 when raised. Ratchet 137 is thus rotated slightly by the pawl 135. This in turn reverses the condition of contacts 64, 141, opening 64 and closing 141. The opening of contacts 64 prevents re-energization of the card feed magnet 60 when contacts 39 are re-closed. At the same time the highest notch in ratchet 137 which is normally just below the path of pawl 133 is raised into said path. Magnets 75, 77 continue active as the stop card does not affect lever 37. Each revolution of cam 126, Fig. 2, will now actuate follower 125 and pawl 124 to feed the paper around one notch. Each oscillatory movement of follower 125 will, through up and down reciprocation of link 129, rock shaft 130. This in turn will cause reciprocatory movement of pawl 133, Figs. 11 and 14. The upper notch of ratchet 137 now being in the path of said pawl, will be engaged thereby and further rotation of ratchet 137 effected; the locking pawl 163 acting to hold the ratchet in each successive position to which it is turned, against the restoring action of a spring 166, Fig. 18. Each paper feeding movement of ratchet 123 will thus be accompanied by a similar movement of ratchet 137. This action continues until a pin 164 carried by the ratchet 137 engages the rotatable member 165, moving the same to cause the pin 166 to dislodge locking pawl 163 from the ratchet 137. As soon thereafter as pawl 133, on its receding stroke, disengages said ratchet, the latter along with cams 139, 140 will be restored by spring 166 to their normal positions, closing contacts 64 and opening contacts 141.

It will be understood that when the stop card causes the opening of contacts 39, such action is only momentary and said contacts are again closed by the same stop card. Thus, as soon as contact 64 is again closed the circuit through the card feeding magnet 60 is re-established and the machine proceeds with the listing of the next group of cards.

Ordinarily in machines of this general character when the last card passes the brushes and card levers, the machine stops, leaving the last card still one or more cycles of the machine removed from its final position in the discharge stack. It is then necessary to restart the machine to carry the card to the stack, or to turn it forward manually. In Fig. 28 I have shown certain modifications designed to so control the apparatus at the end of its run as to automatically cause the last card to be carried to the discharge stack. In this form the card lever 37ª besides operating contacts 40, 41 also operates contacts 167. The latter contacts are normally closed and are opened when the lever is actuated by a card. An additional card lever 168 may also be employed to operate normally closed contacts 169 and normally open contacts 170. The contacts 170 are connected in series with the magnet 75; contacts 169 are shunted across conductors 65, 65ª, and contacts 167 are connected to one side of the card feed magnet 60.

When the start key 55 is depressed closure of contacts 78 will energize relay 59 and card feed magnet 60. As soon as contacts 39 are closed by a card, magnet 60 will be energized through said contacts, and relay 59 will open. Closure of contacts 57 will temporarily energize magnet 77 through relay 59, wire 68, normally closed contacts 167, binding post 171, contacts 57, to effect the initial feeding stroke of the paper.

In this form of the invention, when the start key is depressed, contacts 57 are maintained closed by the action of the member 71. When the cards close contacts 39 they, of course, also open contacts 167. The opening of the latter contacts breaks the circuit through the paper feeding magnet 77, but this is immediately re-established as follows: from the left side of the line, through contacts 39, magnet 60, contacts 62, contacts 40, binding post 171, contacts 57 and through magnet 77 to the other side of the line.

At the end of the printing operations, after the last card of the last group has passed the reading position and the card levers 37ª, 38 and 168, said levers and the contacts actuated thereby will assume their normal positions; contacts 40, 41, 39 and 170 opening and contacts 167 and 169 closing. The opening of contacts 39 will deenergize magnet 60, resulting in the usual stoppage of the card feeding action and in the raising of pawl 135. At the time of the opening of contacts 39 and the resultant action of magnet 60 and pawl 135, contacts 170 will not yet have opened and magnet 75 will cause pawl 135 to engage and move ratchet 137 one notch, causing reversal of the condition of contacts 64 and 141. The closing of contacts 141 will energize paper feed magnet 77; the current passing from the left side of the line, through contacts 141, binding post 171, contacts 57, magnet 77, to the other side of the line. The opening of contacts 64, however, is counteracted by the closing of contacts 169 which maintain the circuit across the wires connected to contacts 64. This and the closing of contacts 167 re-establish a circuit through magnet 60 as follows: from the left side of the line through contacts 141, binding post 171, contacts 167, wire 68, magnet 60, contacts 62, wire 63, contacts 169, to the other side of the line. The magnet 60 then, is re-energized as soon as the ratchet 137 is turned one notch so that the card feeding mechanism will operate and carry the last card to the discharge stack. The energization of the paper feed magnet 77 on the other hand will effect feeding of the paper and the stepping up of the cams 139, 140 in the manner previously set forth. When the ratchet 137 reaches the limit of its rotation it will return as we have seen, and contacts 64, 141 will resume their normal conditions; 64 being closed and 141 open. The opening of contacts 141 will break the circuit through magnets 60 and 77, thus stopping the card feeding and paper feeding mechanisms.

As shown in Fig. 18, the member 165 may be frictionally engaged by a spring pressed plate 172, said plate being fixed against rotation by a pin 173, Figs. 11 and 14. The purpose of this is to maintain the plate 165 in a fixed position except as moved by the action of pin 164.

In the foregoing description the operation of the printing devices has been described in detail. Summarizing, it may be stated that the record cards are fed successively past the brushes which read the index point perforated designations upon the cards during their advancing movement. Concurrently therewith the printing drum is synchronously rotated so as to bring the type to the printing point which corresponds to index point designations then under the brushes or other reading devices. If an index point perforation is in the card, the particular and corresponding type will be impelled forwardly to print upon the paper. The printing of an entire line is not necessarily effected simultaneously, but the types act individually and only strike simultaneously upon the sheet when more than one like designation are being read simultaneously.

The path of the type in effecting the printing may be said to be an epicyclic one inasmuch as the type members are pivotally mounted upon a rotatable support and travel as a whole circumferentially about the center of the support. In addition, the individual type members being pivotally mounted upon the rotatable support describe an arc of a circle with respect to a point on the circumference of said support. These two motions when combined develop an epicyclic path for the type per se.

What I claim is:

1. In combination, a rotatable element, a type member pivotally mounted upon said member, and means movable into the path of said type member during the rotation of the element for actuating the type member and for swinging the type thereon in an epicyclic path into printing position.

2. In combination, a rotatable element, a type member carried by said element, means movable into the path of said member for actuating the same, and means for positively restoring said member to inoperative position.

3. In combination, a paper holder, a rotatable element, a type member carried by said element and adapted to be moved past said holder, and controllable means adapted to cause said member to strike said holder when passing the same, said type member being free from control of said controllable means at the time when the said type member is striking the holder.

4. In a listing machine, card perforation reading means, a rotatable element, a type member carried by said element and means controlled by said reading means for actuating said member.

5. In a listing machine, a rotatable drum, a plurality of type members carried by said drum, paper carrying means adjacent said drum and card-controlled means for selectively actuating said members when the latter are passing said carrying means for effecting printing on a paper on said carrying means.

6. In combination, a rotatable element, a type carrying lever on said element, tripping means for actuating said lever, and perforated card-controlled means for controlling said tripping means.

7. In a printing device, a rotatable element, a type member movably carried by said element, locking means also carried by said element adapted to normally hold said member in inoperative position and means actuating said locking means in accordance with the rotation of said element for causing unlocking of said member at a predetermined point.

8. In a card controlled printing machine, a rotatable drum, type levers carried by said drum, means for actuating said type levers, electromagnets for controlling said actuating means, a source of energy for said magnets, and card-controlled means for controlling the energization of said magnets.

9. In a card controlled printing machine, a rotatable drum, type levers carried by said drum, means for actuating said type levers, an electromagnet-controlled rod for actuating said means and a cam cooperating with said rod for releasing said means.

10. In a card controlled printing machine, a rotatable type carrier, a plurality of type members circumferentially arranged on said carrier, means for selectively actuating said members and card-controlled means for controlling said actuating means.

11. In a card controlled printing machine, a rotatable type carrier, a plurality of type members circumferentially arranged on said carrier, means for supporting a paper adjacent said carrier, a hook adapted to trip any of said members while the latter is passing said means, and card-controlled means for controlling actuation of said hook.

12. In a printing machine of the class controlled by perforated cards, a rotatable drum, a plurality of type characters circumferentially disposed on said drum, means for supporting a paper adjacent said drum, and card-controlled means for bringing a selected one of said characters into operation when the latter is in a predetermined position with respect to said supporting means.

13. In a printing machine of the class controlled by perforated cards, a rotatable drum, a plurality of type characters circumferentially disposed on said drum, means for receiving a print impression adjacent said drum, and card-controlled means for selectively urging one of said characters and said first named means together when such character occupies a predetermined position.

14. In a printing device, a rotatable element, a type lever carried thereby, a platen adjacent said element, means for rotating said drum, means adapted to engage said lever and to actuate the same against said platen, and means for effecting the release of said lever just before it strikes said platen.

15. In a perforated card-controlled machine, card-feeding means, means for sensing perforations in a card, printing means, means controlled by said sensing means for controlling actuation of said printing means, paper feeding means for advancing the paper one line space for each impression and a plurality of line spaces between successive card groups, and stop card controlled means adapted to arrest the operation of said card feeding means during operation of said paper feeding means.

16. In a perforated card-controlled machine, card-feeding means, means for sensing perforations in a card, printing means, means controlled by said sensing means for controlling actuation of said printing means, paper feeding means for advancing the paper one line space for each impression and a plurality of line spaces between successive card groups, stop card controlled means adapted to arrest the operation of said card feeding means during operation of said paper feeding means, and means for causing restarting of said card feeding means.

17. In a machine of the class described, record sensing means, printing means controlled thereby, paper carrying means associated with said printing means, means for actuating the carrying means a predetermined degree after each printing operation, and means for causing said carrying means to be actuated a greater degree after predetermined periods in the printing operation.

18. In a card-controlled listing machine, rotatable printing mechanism, actuating means for said mechanism, and card-controlled means for controlling said actuating means.

19. In a card-controlled listing machine, rotatable printing mechanism, a hook for actuating said mechanism, card-controlled means for moving said hook to operative position, and a timed controlling means for restoring said hook to inoperative position.

20. In a card-controlled listing machine, rotatable printing mechanism, a hook for actuating said mechanism, card-controlled means for moving said hook to operative position, a timed controlling means for releasing said hook, and means for restoring said hook to inoperative position.

21. In a card-controlled listing machine, paper carrying means, printing means, means for imparting feeding movement to said carrying means after each printing operation, and means for causing said feeding means to effect a plurality of such feeding movements after a printing operation.

22. In a card-controlled listing machine, card feeding means, paper feeding means, card controlled printing means, means for normally actuating said paper feeding means in synchronism with the operation of said card feeding means, card-controlled means for stopping the operation of said card feeding means during operation of said paper feeding means, and means for restarting said card feeding means after a predetermined number of paper feeding operations.

23. In a perforated card-controlled machine having a supply station and a receiving station, card feeding means for carrying a card from said supply station to said receiving station, card-actuated means adapted when actuated by a card to maintain said feeding means in operation and when released by a card to cause said feeding means to stop, and additional means brought into operation by said stopping action for causing continued operation of said feeding means for a predetermined duration.

24. In a card-controlled machine, a supply station and a receiving station, means for feeding cards from said supply station to said receiving station, and delayed action means for stopping said feeding means after a card passes a predetermined point in said machine.

25. In a card-controlled machine, a supply station and a receiving station, means for feeding cards from said supply station to said receiving station, means controlled by the presence of a card at a predetermined point in said machine for controlling said feeding means and adapted when no card is present at said point, to stop said feeding means, means brought into operation by said stopping action for restarting said feeding means, and a delayed action device responsive to said restarting for again stopping said feeding means.

26. In a card-controlled machine, means for feeding cards through the machine, and means controlled by the movement of a card past a predetermined point in the machine for stopping said feeding means and for restarting the same.

27. In a card-controlled machine, a pocket adapted to contain a stack of cards, means adapted to feed such cards separately through the machine, means controlled by the movement of the last card from said pocket past a predetermined point for stopping said feeding means before said last card has passed through the machine, and means also controlled by said movement for causing said last card to be carried through the machine.

28. In a card-controlled machine, a supply pocket adapted to contain a stack of cards, a receiving pocket, means for feeding cards separately from said supply pocket to said receiving pocket, means controlled by the movement of the last card of a stack past a predetermined point for stopping said feeding means before such card reaches said receiving pocket, and means also controlled by such movement for causing said last card to be carried to said receiving pocket.

29. In a card-controlled machine, a supply pocket adapted to contain a stack of cards, a receiving pocket, means for feeding cards separately from said supply pocket to said receiving pocket, and means controlled by the movement of the last card of a stack past a predetermined point for causing said feeding means to stop after said last card reaches said receiving pocket.

30. In a card-controlled machine, a supply pocket adapted to contain a stack of cards, a receiving pocket, means for feeding cards separately from said supply pocket to said receiving pocket, and delayed action stopping means controlled by the passage of the last card of a stack for stopping said feeding means.

31. In a machine adapted to be controlled by record cards having index points thereon, means for cooperating with the index points of said cards, means for feeding cards past said cooperating means, a plurality of type members, means for continuously moving said members through a predetermined printing position synchronously with the feeding of such cards, and means controlled by said cooperating means for selectively calling said type members into operation when passing through said position.

32. In a card controlled machine, card feeding mechanism, a plurality of type members, means for moving said members through a predetermined printing position in synchronism with the feeding of such cards, and card controlled means for individually calling said members into operation while passing through said position.

33. In a machine adapted to be controlled by record sheets having index points thereon, means for cooperating with the record sheet index points, means for feeding the record sheets past said cooperating means, a plurality of type members of varying designations arranged to correspond in relative positions and designations with the index points of a sheet, means for moving said members past a predetermined printing line in synchronism with the movement of the index points of a sheet past said cooperating means, and means controlled by said cooperating means for selectively calling said members into operation while passing through said printing line.

34. In a printing machine adapted to be controlled by data-containing means, data sensing elements, type members, means for causing said members to move continuously toward a fixed printing position, and means controlled by said sensing elements for selectively calling said members into operation while the latter are passing through said position.

35. In a printing machine, a plurality of type members, continuously moving means for carrying said members through a predetermined printing position, and means for selectively calling one or a plurality of said members into operation while passing through said position.

36. In a printing machine, a plurality of type members, continuously moving means for carrying said members through a predetermined printing position, and means for separately calling any of said type members into operation while passing through said position.

37. In a machine adapted to be controlled by record sheets having index points thereon, means for cooperating with the record sheet index points, means for feeding the record sheets past said cooperating means, a plurality of type members of varying designations arranged to correspond in relative positions and designations with the index points of a sheet, means for moving said members past a predetermined printing line in synchronism with the movement of the index points of a sheet past said cooperating means, and means controlled by said cooperating means for separately calling any of said members into operation while passing through said printing line.

38. In a machine adapted to be controlled by record cards having index points thereon, means for cooperating with the index points of said cards, means for feeding cards past said cooperating means, a plurality of type members, means for continuously moving said members through a predetermined printing position synchronously with the feeding of such cards, and means controlled by said cooperating means for selectively and individually calling said type members into operation when passing through said position.

39. In a printing machine, in combination, a supporting element, a type member carried thereby, means for moving said element and thereby advancing a type member first towards printing position and then away from such position, means for locking said type member at all times except when it is adjacent the printing position, means for actuating the type member to displace the same with respect to its movable support when it is adjacent its printing position to thereby effect printing, and means for subsequently restoring the type member from its displaced position to its locked position.

40. In a printing machine including in combination, a continuously rotatable support, a plurality of type members circumferentially disposed thereon, said members being normally disposed tangentially upon said support, and means for displacing a member towards substantially radial position when printing is to be effected thereby.

41. A printing machine including type members pivotally supported upon a rotatable support, and adapted to continually precess towards printing position, means for normally retaining said members in substantial tangential relation to said support when the members are remote from the printing position, means operative when the members approach the printing position for displacing a selected member or members toward substantially radial position whereby printing may be effected thereby.

42. In a printing machine, a plurality of type members, a rotatable support therefor, said type members being circumferentially disposed thereon, means for imparting a continuous rotary movement to said support and for thereby carrying said type members through a predetermined printing position, and means for selectively calling said members into operation while passing through said position.

43. In a printing machine, in combination with a rotatable support, a plurality of type members circumferentially disposed in a single row upon said support, means for rotating said support for continuously advancing different type carriers in said row to the printing line, and means operable during a single revolution of said support for selectively calling any type member in said row into operation while passing the printing line.

44. A printing device including a plurality of type members, a mounting for said members, and a driving means therefor adapted to cause said type members to constantly precess towards printing position, and means for selectively and individually causing said type to effect printing.

45. A printing device including a rotatable drum, a plurality of type members circumferentially disposed thereon and selectively controlled hook-like members adapted to coact with said type members to move one of said members toward a record sheet when said member occupies a predetermined position.

46. In a printing machine, in combination with a rotatable support, a type member carried thereby, means for pivotally supporting said member on said support, means upon said support having provisions for displacing said type member about its pivot subsequently locking it in displaced position and thereafter releasing the type member when the latter approaches the printing position, and means displacing the type member towards a radial position with respect to its support whereby the type may be impelled to strike the record sheet to be printed.

47. A printing machine including a rotatable support provided with pivotally mounted type members thereon, means operable synchronously with the rotation of the support for restoring displaced type members to a substantially tangential position with respect to the support after the members have passed the printing position, said means having provisions for subsequently retaining said members in such position until they again approach the printing position whereupon they are released, and means movable into the path of said member adjacent the printing for engaging the same to cause the members to be displaced to substantially radial position by and upon the advancing of the support whereupon the type members may effect printing.

48. A printing machine including pivotally mounted type members carried by a rotatable support, and means for selectively engaging the type members to cause the same to be swung pivotally with respect to the support upon and by the advancing movement of the same whereby printing impressions may be made by said type members.

49. A printing machine including pivotally mounted type members carried by a rotatable support, means for engaging selected type members to cause the same to be swung pivotally with respect to the support upon and by the advancing rotational movement of the support, and means for releasing the aforesaid means from engagement with the type members prior to the striking of the paper thereby whereby the impressions are effected by the momentum of the type members.

50. A printing couple comprising a record supporting element and a plurality of movable type members, means for continuously displacing said type members past the printing position and means for imparting a striking movement to a selected type member as said member is adjacent the printing position, said means being free from said member at the time the latter strikes the record whereby printed impressions are secured thereby solely by the momentum of the type members.

51. A printing machine including a type member and supporting and actuating means therefor, means cooperating with said support having provisions for imparting a rotary movement thereto and to the type member carried thereby, and means for imparting a supplementary pivotal swinging movement to the type member during the rotary movement of its support to cause the type member to strike the record.

52. In a printing machine including a record support, in combination with a plurality of continuously movable type members, and means for imparting supplementary momentum to said type members, said means having provisions to cause the members to strike the record solely under the influence of their own momentum.

53. A perforated record controlled machine comprising a plurality of pivotally mounted type members, means for continuously moving the same in a circumferential path, means for imparting supplementary pivotal striking movements to said members to cause the latter to strike a record sheet, and perforated index point controlled means for selectively calling the aforesaid means into operation.

54. A perforated record controlled machine including type members supported both for movement in a circumferential path and for movement in a supplemental pivotal striking path, and perforated index point controlled means for selectively calling one or a plurality of said members into movement in their striking paths.

55. A perforated record controlled machine including type members supported both for movement in a circumferential path and for pivotal movement in individual striking paths, and perforated index point controlled means for selectively calling a plurality of different type members into movement in their striking paths whilst the latter traverse one revolution in their circumferential paths.

56. A perforated record controlled printing machine including a rotatable type member support, a plurality of type members movably mounted thereon, means for sensing perforated records, and means controlled thereby for selecting the desired type members for operation, said means being adapted to simultaneously select a plurality of different type members, or to effect said selection of said different type members at different times in the rotating cycle of said support.

57. A perforated record controlled machine including in combination with a rotatable type member, a plurality of type thereon individually displaceable to strike a record sheet, perforated index point controlled means for simultaneously displacing said members to striking position to simultaneously print a complete line upon a record, said means being also adapted to control said members to successively displace the same whereby printing of a complete line upon a record may be effected by a plurality of differently timed striking operations.

58. In a printing machine, the combination with a rotatable support and means for rotating it, of type hangers pivoted on said support, a platen, and means for selectively turning the hangers on their pivots to deliver a printing impact as the hanger passes the printing line of the platen.

59. In a printing machine, the combination with a rotatable support and means for rotating it, of a series of type arms pivoted on the support, a platen, a receptacle for cards perforated to represent varying data, and devices controlled by said cards for selectively operating the type hangers on their pivots to print characters corresponding to the card perforations as the hangers pass the platen.

60. In a printing machine, the combination with a rotatable support and means for rotating it, of a series of type arms pivoted on said support, a platen having its impression line parallel to the axis of the rotatable support, a receptacle for cards perforated to represent varying data, devices controlled by said cards for selectively operating the type hangers to strike a printing blow as the hangers pass the printing line, locking devices normally preventing printing movement of the type arms when said arms are away from the printing position, and devices controlled by the rotatable support for rendering the locking devices ineffective at the printing position.

61. In a printing machine, a plurality of groups of type carriers, a platen, a movable support to which the carriers are pivoted and means for moving the support to carry the type carriers successively past the platen, means for giving a percussive movement to any desired type carriers as said carriers pass the platen, and devices controlled by index point perforations of record cards for operating said means at different points in the movement of the support.

62. In a printing machine, the combination with a rotatable support and means for rotating it, of a series of type arms pivoted on the support, a platen, devices for feeding record material perforated to represent varying data, and devices controlled by the perforations for selectively turning the type hangers on their pivots to print characters corresponding to the perforations as the hangers pass the platen.

In testimony whereof I hereto affix my signature.

FRED M. CARROLL.